United States Patent
Starck et al.

(12) 
(10) Patent No.: US 6,232,571 B1
(45) Date of Patent: May 15, 2001

(54) MEDIUM-VOLTAGE CIRCUIT-BREAKER AND DISCONNECTOR MODULE, AND A CORRESPONDING POWER DISTRIBUTION SUBSTATION

(75) Inventors: Thierry Starck, Castries; Said Attack, Montpellier, both of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/504,119

(22) Filed: Feb. 15, 2000

(30) Foreign Application Priority Data

Feb. 15, 1999 (FR) .................................................. 9901779

(51) Int. Cl.⁷ .......................... H01H 33/02; H01H 33/28
(52) U.S. Cl. ......................... 218/153; 218/155; 218/140
(58) Field of Search .................................. 218/43, 44, 45, 218/67, 71, 75, 78, 84, 118–120, 140, 152–155

(56) References Cited

U.S. PATENT DOCUMENTS

| | | |
|---|---|---|
| 2,374,702 | 5/1945 | Reilly . |
| 3,932,720 * | 1/1976 | Gaigg et al. ..................... 200/148 R |
| 4,884,166 | 11/1989 | Thuries et al. . |
| 5,321,221 * | 6/1994 | Rozier .................................. 200/145 |
| 6,025,983 * | 2/2000 | Uchida et al. ....................... 361/606 |

FOREIGN PATENT DOCUMENTS

| | | |
|---|---|---|
| 2 683 940 A1 | 5/1993 | (FR) . |
| 2 689 305 A1 | 10/1993 | (FR) . |
| 2 725 843 A1 | 4/1996 | (FR) . |

* cited by examiner

*Primary Examiner*—Lincoln Donovan
*Assistant Examiner*—Tuyen T. Nguyen
(74) *Attorney, Agent, or Firm*—Sughrue, Mion, Zinn, Macpeak & Seas, PLLC

(57) ABSTRACT

The module comprises a metal enclosure constituting a metal-clad housing receiving a multipole circuit-breaker and disconnector units where disconnection is performed by tilting the set of poles away from an in-service position in which each pole is simultaneously connected to two current feedthroughs projecting through the top wall of the housing. The distribution substation comprises a metal enclosure constituting a metal-clad housing that is subdivided into compartments serving specifically to house three multipole circuit-breaker and disconnector units in parallel alignment between two feeders. The poles of the units are interconnected via current feedthroughs passing through intermediate compartments, each of which has a feeder terminating therein.

9 Claims, 3 Drawing Sheets

MEDIUM-VOLTAGE CIRCUIT-BREAKER AND DISCONNECTOR MODULE, AND A CORRESPONDING POWER DISTRIBUTION SUBSTATION

The invention relates to a medium-voltage circuit-breaker and disconnector module, in particular for outdoor installation, and to a corresponding power distribution substation.

BACKGROUND OF THE INVENTION

Air-insulated medium-voltage circuit-breaker modules for installation outdoors are commonly made up of circuit-breaker boxes for installation indoors that are placed inside a protective metal enclosure and which are connected to electricity lines via air/air type current feedthroughs mounted in openings in a roof-forming wall of the enclosure. Such outdoor circuit-breaker modules are generally associated with disconnectors that are situated outside the enclosures and which enable the boxes to be isolated to allow access to the components thereof for maintenance or replacement purposes, or indeed to isolate the incoming and outgoing feeders connected thereto. Such combinations of equipment are relatively large and complex.

Document FR-A-2 683 940 describes an embodiment of a medium-voltage circuit-breaker for outdoor installation which also constitutes its own disconnector. Disconnection is implemented by tilting its poles between a position in which the poles are electrically connected to connection feedthroughs of the circuit-breaker, and a position that is situated angularly at 90° therefrom and in which the poles are isolated from the feedthroughs. That circuit-breaker is incorporated in a module having a circuit-breaker support drawer suitable for being extracted in part in order to enable operating personnel to take action thereon for maintenance and/or replacement purposes. More specifically, provision is made to connect the circuit-breaker and disconnector unit to live bare conductors which extend laterally as far as the circuit-breaker. This implies that the module must be installed high up, on a pylon, to comply with safety standards. Such a solution presents serious drawbacks in terms of controlling the circuit-breaker and of giving operating personnel access to the various components situated inside the module that includes the circuit-breaker.

OBJECTS AND SUMMARY OF THE INVENTION

The invention thus proposes a medium-voltage circuit-breaker and disconnector module, in particular for installation outdoors and at ground level, and a corresponding power distribution substation.

The medium-voltage circuit-breaker and disconnector module includes a conventional multipole circuit-breaker and disconnector unit in which disconnection is performed by tilting the set of poles about a common axis from an in-service position in which each pole is connected to corresponding fixed connection pieces of the module via complementary connection pieces fixed to its own ends to a disconnection position in which the complementary connection pieces carried by the poles are disconnected from the fixed connection pieces following pivoting of a beam on which the poles are fixed, said module also having a metal enclosure in which the circuit-breaker is housed, carried on a movable carriage.

The invention also proposes a medium-voltage power distribution substation of the one-and-a-half breaker type for installation outdoors or indoors.

BRIEF DESCRIPTION OF THE DRAWINGS

The invention, its characteristics, and its advantages are described in greater detail in the description given below with reference to the following figures.

MORE DETAILED DESCRIPTION

Figure 1:
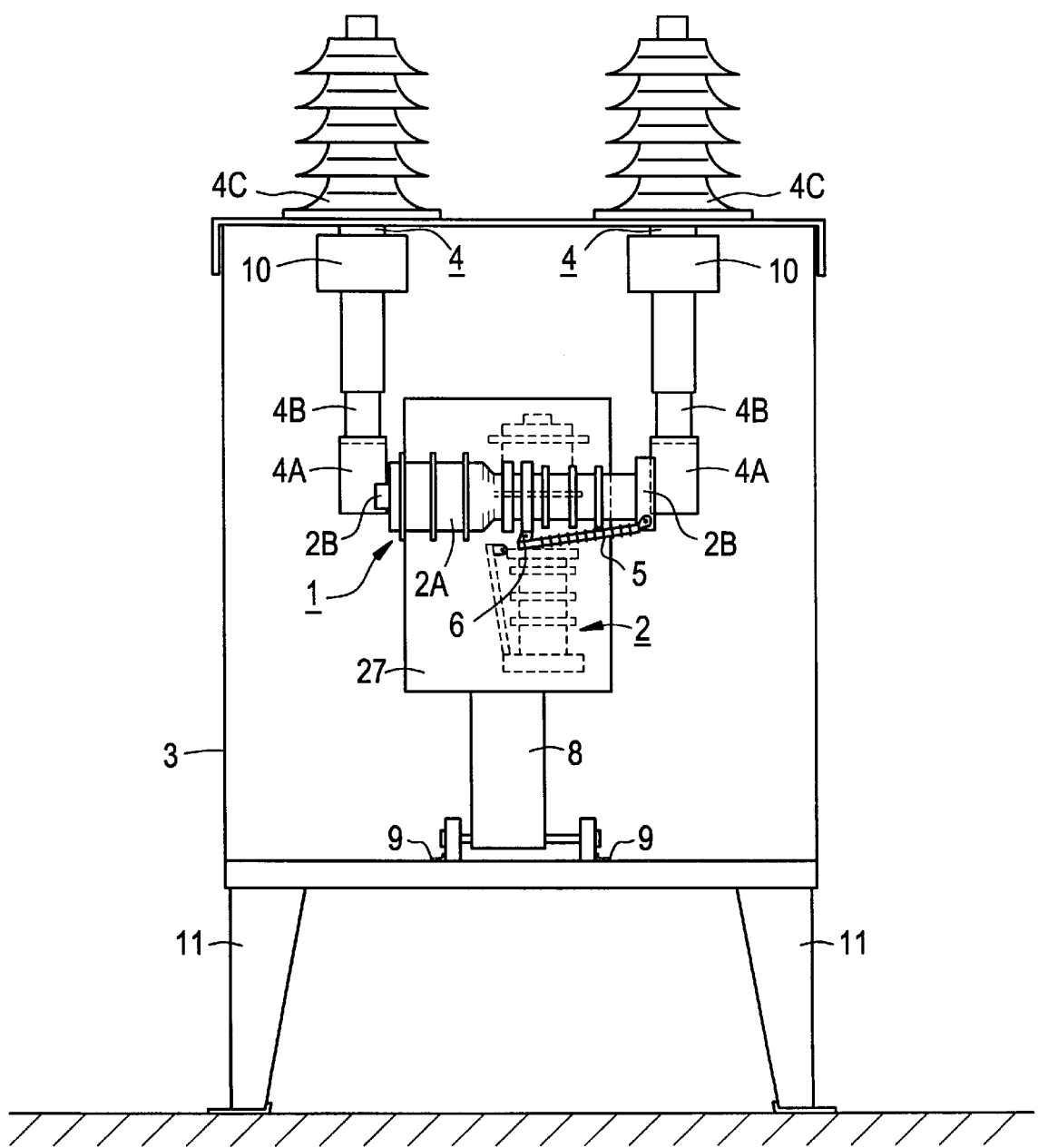
FIGS. 1 and 2 are respectively a mid-cross-section and a mid-longitudinal section through a circuit-breaker and disconnector module of the invention.
Figure 2:
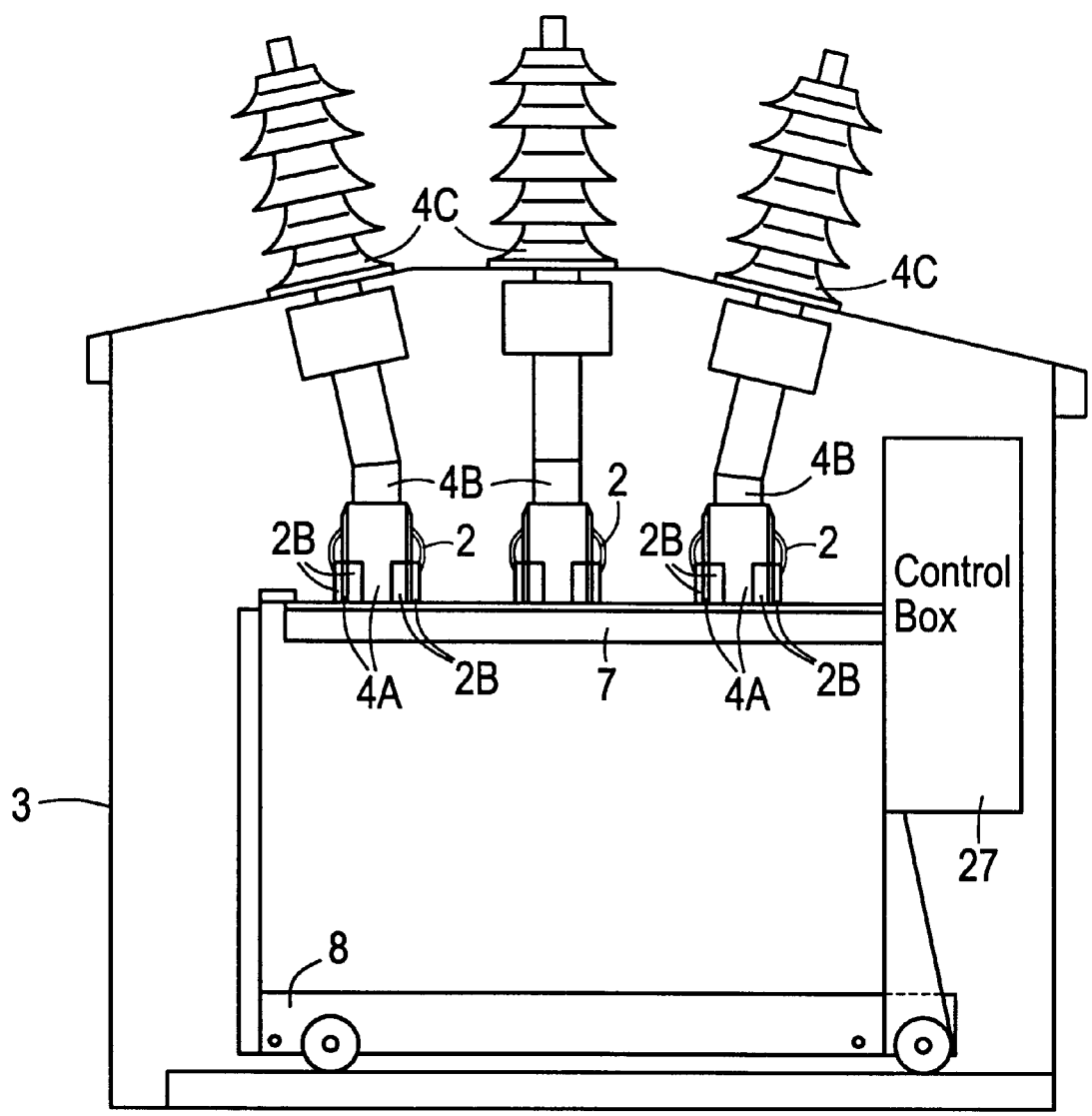

The medium-voltage three-phase circuit-breaker module more specifically intended for outdoor installation and as shown in FIGS. 1 and 2 essentially comprises:

a circuit-breaker and disconnector unit 1 having three poles 2 in which disconnection is performed by tilting the set of poles; tilting takes place between an in-service position in which each pole is connected via its ends to two connection feedthroughs 4, and a disconnection position in which said poles are disconnected from the feedthroughs, after the beam 7 carrying the circuit-breakers has been pivoted, the circuit-breaker being identical or similar to that described in document FR-A-2 683 940;

a metal enclosure 3 of the type comprising an openable housing that is grounded and in which the circuit-breaker 1 is housed; and fixed connection pieces, which in this case are carried by the feedthroughs 4, whereby the poles of the circuit-breaker are connected to feeding incoming conductors such as feeder wires, and to outgoing conductors, usually of the cable or busbar type, serving the equipment that is protected by the circuit-breaker.

Each of the poles 2 comprises a tubular body 2A provided with fins and made of an insulating material, e.g. a resin, and within which there is housed a break chamber (not shown). Each break chamber has a fixed contact and a moving contact connected to respective connection pieces 2B carried at the ends of the pole.

Each connection piece 2B is suitable for engaging a complementary connection piece 4A that is fixed and carried by the central conductor 4B of a feedthrough 4 when the poles of the circuit-breaker are brought into the horizontal, in-service position. By way of example, the connection pieces can be of the interfitting clamp type, and contact can be obtained by mutual thrust between the complementary connection pieces of a pole and of the central conductor of a feedthrough.

In this case, it is assumed that the movements of the moving contact in each break chamber are controlled by means of a linkage, with one of the outer elements constituted by a rod 5 being shown. In conventional manner, said linkage serves to act on the moving contact of the chamber when it is itself driven by a control shaft 6 which is housed in a pivot beam 7 on which the poles of the circuit-breaker are fixed and which serves to tilt them when it pivots. The poles 2 are tilted and the moving contact in each break chamber is controlled from a control box 27. The box contains, in particular, a mechanism for driving the control shaft 6 to cause the break chambers to perform opening and closing cycles, and a mechanism for tilting the poles by pivoting the pivot beam 7 about its longitudinal axis. This tilting preferably takes place through 90°, as shown in dashed lines in FIG. 1.

In the embodiment shown, the poles 2 of the circuit-breaker are disposed horizontally one behind another when they are in the in-service position. They are tilted vertically as shown in dashed lines in FIG. 1 when they are disconnected.

The pivot beam 7 is mounted on a support carriage 8, assumed to be of U-shaped structure in this case, with the beam being pivotally mounted to the ends thereof so as to allow the poles to tilt between the limbs of the U-shape. In this case, the control box 27 is fixed perpendicularly at one end of the beam. The support carriage 8 is mounted on wheels and it is guided by at least one rail 9 which enables the circuit-breaker to be displaced so that it can be positioned accurately relative to the feedthroughs, or else so that it can be extracted from the enclosure 3 through an opening that is designed otherwise to be closed, e.g. by a door or by a panel.

The precise positioning provided for the circuit-breaker relative to the feedthroughs to which it is connected is selected in this case so as to ensure that the connection pieces 4A respectively carried by the two feedthroughs 4 serving a given phase are in alignment and spaced apart by a distance corresponding to the distance between the complementary connection pieces 2B carried by the pole 2 associated with that phase. The fixed connection pieces carried by the feedthroughs are thus disposed in parallel rows, and the number of rows is equal to the number of poles of the circuit-breaker.

Interconnection by mutual engagement between the connection pieces 2B and 4A takes place simultaneously by sliding at both ends of each pole at the end of the pivoting operation that returns the poles to the horizontal position. To this end, each connection piece 4A is connected to one end of the corresponding central conductor 4B extending longitudinally in the corresponding feedthrough 4. This is the end which is to be found inside the metal enclosure 3 in which the circuit-breaker is housed, as can be seen in FIGS. 1 and 2. Each conductor 4B is held stationary in an opening formed through the top wall of the enclosure 3 through which it passes by means of an insulating body 4C that surrounds the conductor and that projects outside the enclosure 3 so as to form a duct having fins on its outside. In this case, the connection pieces 4A are all located at the same height inside the housing defined by the enclosure 3.

When the circuit-breaker is disconnected by having its poles put into the vertical position, the connection pieces 2B of the poles are at a dielectric distance from the connection pieces 4A of the feedthroughs that is sufficient to enable respective distances to be established between the circuit-breaker and the two corresponding conductors of the upstream and downstream circuits between which the circuit-breaker is inserted.

In a preferred embodiment, the feedthroughs are fitted with toroidal current transformers 10 which in this case are mounted on the feedthroughs inside the metal enclosure 3, but which could possibly be mounted outside it.

The metal enclosure 3 of a circuit-breaker module of the invention serves to provide a degree of protection between the inside and the outside, and it can be raised off the ground by a stand 11 for safety reasons, as shown in FIG. 1. The circuit-breaker itself can be constituted in the manner described in either of documents FR-A-2 725 830 and FR-A-2 725 843.

Figure 3:
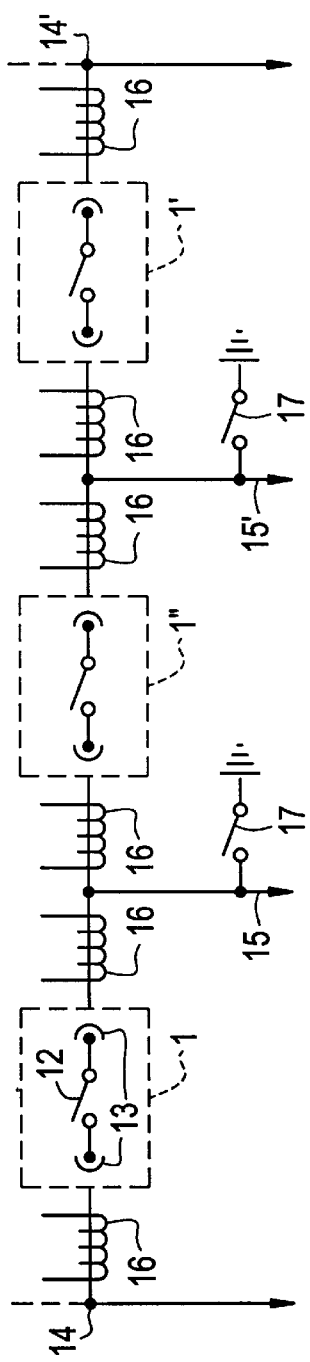
FIG. 3 is a conventional electrical circuit diagram for a power distribution substation of the one-and-a-half breaker type.

The invention also provides an outdoor or indoor metal-clad power distribution substation of the one-anda-half breaker type using a circuit-breaker and disconnector unit with disconnection being provided by pivoting the poles in the manner used by the module of the invention. Such a substation is designed to feed two distinct outgoing cable feeders from one or other of two incoming feeders using the conventional electrical circuit shown in FIG. 3.

In general, a one-and-a-half breaker type substation has two distinct incoming feeders 14 and 14' capable of being powered independently via polyphase links, in this case three-phase links, each constituted by a line or a cable whose respective phase conductors are connected to an associated incoming circuit-breaker and disconnector unit 1 or 1'.

A circuit-breaker and disconnector unit of the type used by the invention can be represented by a circuit-breaker 12 associated with two disconnectors 13, one at each end. Each circuit-breaker and disconnector unit 1 or 1' performs the same function as an assembly constituted by a circuit-breaker with an incoming disconnector and an intermediate disconnector respectively connected to its upstream and downstream ends.

It is also known that in a one-and-a-half breaker type electric circuit, an intermediate circuit-breaker and disconnector unit 1" is inserted between the two circuit-breaker and disconnector units 1 and 1'.The cables 15 and 15' respectively provided for each of the outgoing feeders are connected between the two circuit-breaker and disconnector units 1 and 1' for one of the outgoing feeders, and between the two units 1" and 1' for the other.

Toroidal type current transformers 16 can be mounted for measurement and management purposes on either side of each of the circuit-breaker and disconnector units 1, 1', and 1".

A disconnector 17 is generally associated with each of the outgoing feeders to enable the cables 15 and 15' to be grounded.

The invention proposes a distribution substation of the one-and-a-half breaker type implemented using circuit-breaker and disconnector units mounted on moving carriages where disconnection is performed by pivoting the poles, and optionally of the same design as the circuit-breaker used in the module constituting the subject matter of claims 1 to 4.

Figure 4:
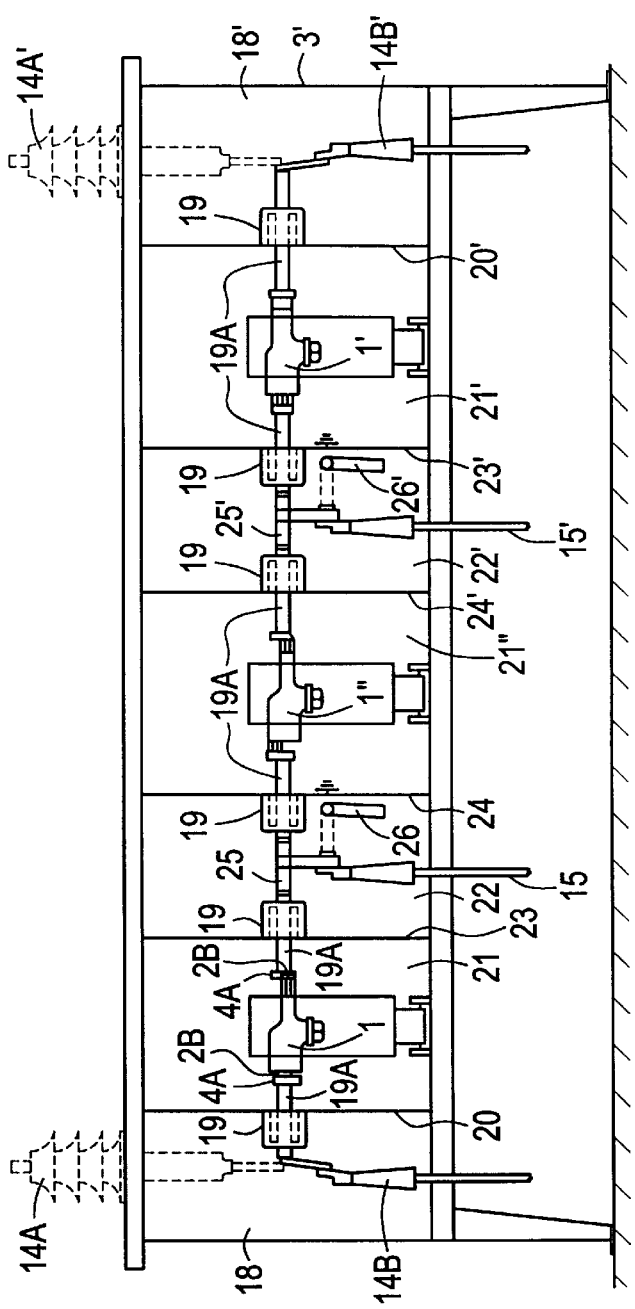
FIG. 4 is a diagram showing a metal-clad distribution substation of the invention and of the one-and-a-half breaker type.

The apparatus of the invention is shown diagrammatically in FIG. 4.

Incoming feeders 14 and 14' are connected to the substation, which feeders may be connected to an overhead line and penetrate into the substation via current feedthroughs 14A, 14' A generally corresponding to the feedthroughs described with reference to FIGS. 1 and 2. These feedthroughs which are shown in dashed lines are shown as being mounted in openings formed through the ceiling of the housing constituted by a metal enclosure 3', at the ends of said housing which also contains the various components of the substation. The feedthroughs serving the feeder 14 are then at the opposite end of the housing relative to the feedthroughs for the feeder 14'. Alternatively, the feeders 14 and 14' could be cable feeders 14B and 14'B, in which case they would be connected to the ends of the metal enclosure 3', but through the bottom thereof, e.g. through the floor of the housing that it constitutes, as shown in solid lines in FIG. 4. In either case, these feeders engage a respective end compartment 18 or 18' in which each of the power conductors corresponding to one of the incoming phases is connected, i.e. three conductors for the usual case of a three-phase substation. Each of the two end compartments of the housing constituted by the enclosure 3' is provided with a multifunctional intermediate current feedthrough 19 to enable each of the incoming conductors to be connected to the corresponding one of the circuit-breaker and disconnector units 1 or 1'. The multifunctional current feedthrough 19 is, for example, of the type described in document FR-A-2 70 593.

In this case, each multifunctional feedthrough end is mounted through an opening provided therefor in an internal partition 20 or 20' separating an end compartment from an adjacent compartment for containing one of the incoming circuit-breaker and disconnector units 1 and 1'. The intermediate circuit-breaker and disconnector unit 1" is interposed between the two incoming units 1 and 1' in a central compartment 21" which is separated from each of the compartments 21 and 21' for those units via respective outgoing intermediate compartments 22 and 22'. All three circuit-breaker and disconnector units 1, 1', and 1" are in alignment in the housing between the two end compartments. In each compartment, the various components belonging to each phase, such as the poles, are positioned one behind another from front to back perpendicularly to the alignment of the three units. The same applies to the multifunctional feedthroughs 19 which are provided respectively for each phase and which are positioned at the same height in the partitions separating successive compartments. In the embodiment shown, the multifunctional feedthroughs 19 are mainly housed in the end compartments or in the intermediate compartments in the partitions separating them from the compartments containing the circuit-breaker and disconnector units. The central conductor 19A passing through each of the multifunctional feedthroughs then opens out into each of the two compartments separated by the partition carrying it.

Each of the central conductors 19A is organized so as to be connected with one of the connection pieces 2B of a pole of the circuit-breaker and disconnector unit 1 or 1' in a manner analogous to that described for the connection of a connection piece 2B with a complementary connection piece 4A. Each of the units 1, 1', and 1" thus serves to connect together each aligned pair of central conductors 19A that penetrate via respective sides through different partitions 20, 20', 23, 23', 24, or 24' into one of the compartments 21, 21', or 21". In the embodiment shown, each of the outgoing intermediate compartments 22 and 22' has a link conductor element 25 or 25' passing therethrough interconnecting the respective central conductors 19A of the two feedthroughs 19 which are in alignment for each phase and that are housed in the partitions 23 and 23' or 24 and 24' defining the compartments.

Each of the link conductors 25 or 25' is connected to one of the outgoing cables 15 or 15' which it serves to feed from one or other of the incoming feeders 14 or 14', depending on the states of the circuit-breaker and disconnector units.

Current is measured at the incoming and outgoing feeders of the substation via toroidal type current transformers installed on the various multifunctional feedthroughs 19 and/or on the incoming feedthroughs 14A, 14'A, or 14B, 14'B included in the substation.

A disconnector 26 or 26' is provided connected to one of the partitions in each outgoing intermediate compartment so as to make it possible to ground each of the three conductors of the cables 15 or 15' which are connected to respective link conductors of the compartment, which cables are assumed in this case to enter the compartment from below, e.g. through its floor.

The distribution substation constituted in this way is shown in this case as being housed in a housing which protects it from the weather and which provides the components it contains with a degree of protection from the outside, like the circuit-breaker and disconnector module described above. The grounding of the enclosure 3' of the substation and of the various partitions therein serves to provide good operating safety for the metalclad substation implemented in this way. Each of the various compartments of the housing is provided with at least one closable opening, with all of the openings being provided on the same side of the housing and being closed by a respective door or panel (not shown) in conventional manner, so as to give easy access to the components housed within the various compartments. Provision is also made to place all of the elements required by operating personnel for driving the substation on one side of the housing, in this case its front face, thereby also making it possible to provide a complete and continuous overview of the substation as a whole.

Organizing the substation in this way makes it possible to achieve a considerable saving in space compared with conventional substations. It makes it possible to obtain a substation that is constituted in the form of a single piece of equipment that can be assembled and tested in the factory prior to installation, thereby saving time and increasing reliability during installation. Improved operating safety can be obtained because it is possible to install mechanical interlock mechanisms between the components within the housing, at the circuit-breaker and disconnector units. Improved accessibility to the components of a circuit-breaker and disconnector unit of a substation is thus obtained insofar as it is possible to extract any one of these units while leaving the other units of the substation in operation.

What is claimed is:

1. A medium-voltage circuit-breaker and disconnector module for installation on the ground in an outdoor environment, the medium-voltage circuit-breaker and disconnector module being constituted by:

a multipole circuit-breaker and disconnector unit comprising a row of mutually parallel poles fixed on a common beam so as to extend across the beam, the beam being parallel to a pivot axis of the row of mutually parallel poles;

a metal enclosure for completely enclosing the multipole circuit-breaker and disconnector unit;

fixed connection pieces for each of corresponding phases of the module; and a carriage, operable to carry the multipole circuit-breaker and disconnector unit, that is movable on rails and that is operative to be installed in a stable position, wherein disconnection of a circuit by the multipole circuit breaker and disconnector unit is performed simultaneously for all phases by pivoting the row of mutually parallel poles about the pivot axis between a substantially horizontal in-service position in which each pole in the row of mutually parallel poles interconnects two of the fixed connection pieces for a corresponding phase of the medium-voltage circuit-breaker and disconnector module via complementary connection pieces fixed to ends of the pole, and a substantially vertical disconnection position in which the complementary connection pieces are disconnected from the fixed connection pieces following pivoting of the beam, wherein the metal enclosure is constituted by a metal-clad housing having a top portion which forms a roof, wherein the roof supports current feedthroughs that are electrically insulated from the metal-clad housing, wherein an end of each feedthrough inside the housing supports one of the fixed connection pieces carried by a central conductor of one of the current feedthroughs, the fixed connection pieces all being disposed substantially at the same height within the metal-clad housing.

2. A medium-voltage circuit-breaker and disconnector module according to claim 1, wherein the metal-clad housing constituting the metal enclosure has a metal floor and a closable access opening in its front face, wherein the closable access opening extends down to the same level as the metal floor and is of a size suitable for enabling the entire multipole circuit-breaker and disconnector unit mounted on the carriage to be extracted.

3. A medium-voltage circuit-breaker and disconnector module according to claim 2, wherein a control box mounted on the carriage is fully contained inside the metal enclosure of the module while remaining accessible to an operator through the closable access opening.

4. A medium-voltage circuit-breaker and disconnector module according to claim 1, wherein the current feedthroughs penetrate into the metal-clad housing in a direction that is perpendicular to the surface of the roof.

5. A medium-voltage power distribution substation of the one-and-a-half breaker type, i.e. containing three circuit-breakers for two electricity outlets, the medium-voltage power distribution substation being suitable for installation on the ground in an outdoor or indoor environment, and comprising;

metal enclosure forming a grounded metal-clad housing; and three multipole circuit-breaker and disconnector units aligned within and completely housed by the metal enclosure, each multipole circuit-breaker and disconnector unit being constituted by a row of mutually parallel poles fixed to a common beam so as to cross the beam, the beam being parallel to a pivot axis of the row of mutually parallel poles, wherein each multipole circuit-breaker and disconnector unit is carried on a respective moving carriage;

wherein disconnection of a circuit by the medium-voltage power distribution substation is performed simultaneously for all phases by pivoting the row of mutually parallel poles about the pivot axis from a horizontal in-service position in which each pole of the row of mutually parallel poles interconnects two fixed connection pieces belonging to a phase of the multipole circuit-breaker and disconnector unit by means of two complementary connection pieces fixed to ends of the pole, and a vertical disconnection position in which the complementary connection pieces are disconnected from the fixed connection pieces following pivoting of the beam, wherein the metal-clad housing has six partitions subdividing it into seven compartments, wherein three of the seven compartments serve to separately house the three multipole circuit-breaker and disconnector units, wherein the three multipole circuit-breaker and disconnector units, when in the horizontal in-service position, are connected to one another and also to electricity feeders via current feedthroughs supported by the six partitions, each compartment having a closable access opening extending down to a level of a metal floor of the metal enclosure and dimensioned so as to enable the multipole circuit-breaker and disconnector unit to be totally extracted from the metal enclosure when in the vertical disconnection position.

6. A medium-voltage power distribution substation according to claim 5, wherein each of two end compartments of the metal-clad housing receive an incoming current feedthrough coming from an overhead line and passing through a ceiling of the metal-clad housing, or a cable feeder by means of cables passing through the metal floor of the metal-clad housing.

7. A medium-voltage power distribution substation according to claim 5, wherein the poles of each of the three multipole circuit-breaker and disconnector units connected to a given phase in the horizontal in-service position, the current feedthroughs, and link conductors located between the three multipole circuit-breaker and disconnector units form an assembly in alignment at the same height in the metal-clad housing.

8. A medium-voltage power distribution substation according to claim 5, wherein toroidal type current transformers are supported by the current feedthroughs fixed on the six partitions.

9. A medium-voltage power distribution substation according to claim 5, wherein a control box of each of the three circuit-breaker and disconnector units is carried on the respective moving carriage that supports the circuit-breaker and disconnector unit and is fully contained within the compartment of the circuit-breaker and disconnector unit while remaining accessible to an operator through the closable access opening of the compartment.

* * * * *